United States Patent
Lefauvre et al.

(10) Patent No.: US 8,487,809 B2
(45) Date of Patent: Jul. 16, 2013

(54) SYSTEM FOR RESPONSE TO A SIGNAL TRANSMITTED BY A RADAR AND USE OF THIS SYSTEM NOTABLY FOR TESTING RADARS, IN PARTICULAR OF THE MTI TYPE

(75) Inventors: Régis Lefauvre, Cavan (FR); Pascal Cornic, Guilers (FR)

(73) Assignee: Thales, Neuilly sur Seine (FR)

( * ) Notice: Subject to any disclaimer, the term of this patent is extended or adjusted under 35 U.S.C. 154(b) by 48 days.

(21) Appl. No.: 12/975,073

(22) Filed: Dec. 21, 2010

(65) Prior Publication Data
US 2012/0001794 A1   Jan. 5, 2012

(30) Foreign Application Priority Data
Dec. 23, 2009 (FR) ..................... 09 06290

(51) Int. Cl.
*G01S 13/75* (2006.01)
*G01S 7/40* (2006.01)

(52) U.S. Cl.
USPC .............................. 342/51; 342/44; 342/174

(58) Field of Classification Search
USPC ..................................... 342/42–51
See application file for complete search history.

(56) References Cited

U.S. PATENT DOCUMENTS

| | | | |
|---|---|---|---|
| 3,573,826 A | | 4/1971 | Fredericks et al. |
| 5,734,965 A | * | 3/1998 | Kersken et al. .................. 455/45 |
| 5,771,021 A | * | 6/1998 | Veghte et al. ........... 343/700 MS |
| 5,825,329 A | * | 10/1998 | Veghte et al. ........... 343/700 MS |
| 6,628,239 B1 | | 9/2003 | Hilliard et al. |
| 6,657,580 B1 | * | 12/2003 | Edwards et al. ................. 342/51 |
| 6,717,923 B1 | * | 4/2004 | Smith ........................... 370/278 |
| 2008/0180253 A1 | * | 7/2008 | Ovard et al. ................. 340/572.4 |
| 2009/0045916 A1 | * | 2/2009 | Nitzan et al. .................. 340/10.1 |
| 2010/0019955 A1 | * | 1/2010 | Durgin ......................... 342/156 |
| 2011/0057791 A1 | * | 3/2011 | Durgin et al. ............ 340/539.27 |

FOREIGN PATENT DOCUMENTS
| | | |
|---|---|---|
| GB | 924 208 A | 4/1963 |
| WO | 2007/136308 A1 | 11/2007 |

* cited by examiner

*Primary Examiner* — Matthew M Barker
(74) *Attorney, Agent, or Firm* — Baker & Hostetler, LLP

(57) ABSTRACT

A system for response to a signal transmitted by a radar includes: a passive antenna capable of receiving and then backscattering a signal transmitted by said radar; a microwave switch connected to said antenna; at least two microwave lines each having a distinct impedance and being connected to the microwave switch; and a generator capable of generating a parametrizable control signal and sending it to the microwave switch so that it switches onto one or other of the microwave lines, so as to modulate the signal backscattered by said antenna.

7 Claims, 2 Drawing Sheets

SYSTEM FOR RESPONSE TO A SIGNAL TRANSMITTED BY A RADAR AND USE OF THIS SYSTEM NOTABLY FOR TESTING RADARS, IN PARTICULAR OF THE MTI TYPE

CROSS-REFERENCE TO RELATED APPLICATION

This application claims priority to foreign French patent application No. FR 0906290, filed on Dec. 23, 2009, the disclosure of which is incorporated by reference in its entirety.

FIELD OF THE INVENTION

The invention relates to systems for response to a signal transmitted by a radar, which are used in particular with MTI (moving target indicator) radars. These are capable of detecting echoes by conventional Doppler processing.

The systems in question are of the responder type, that is to say capable of responding to a transmitted signal (here a signal transmitted by the MTI radar). For example, they are used within location beacons indicating distances.

More generally, these systems are on board co-operative targets, for example an aircraft. They thus serve to help the aircraft when landing on a deck. The radar communicating with the response system can determine its position and therefore guide it.

Conventionally, these "responder" systems are of the active type with generation of microwave signals and synchronization with the signals transmitted by the radar.

BACKGROUND

These systems are complex and expensive, as they are based on the retransmission of a microwave signal after a time delay and transposition of the signal by frequency modulation. All these operations involve a considerable number of components.

Furthermore, these systems, which are particularly energy intensive, generally require a mains-type supply. This makes use in the field difficult. If the supply is by a battery, the energy consumption of the active elements limits the autonomy thereof.

Moreover, the presence of active oscillators makes these response systems detectable, which may be prejudicial in certain applications.

In the case of a system on board an aircraft, in which the volume, weight and consumption of the aircraft mains must be minimized, these systems are penalizing.

Finally, said systems require regular maintenance.

SUMMARY OF THE INVENTION

The invention notably solves the abovementioned problems.

For this purpose, according to a first aspect of the invention, what is proposed is a system for response to a signal transmitted by a radar.

According to a general feature of this aspect, the system comprises:
 a passive antenna capable of receiving and then backscattering a signal transmitted by said radar;
 a microwave switch connected to said antenna;
 at least two microwave lines each having a distinct impedance and being connected to the microwave switch; and
 a generator capable of generating a parametrizable control signal and sending it to the microwave switch so that it switches onto one or other of the microwave lines, so as to modulate the signal backscattered by said antenna.

In other words, this aspect of the invention provides a response system with a passive antenna and an impedance mismatching means formed using microwave lines. This makes it possible to create a radar echo by a time variation of the cross section of the antenna, with a modulation frequency of adjustable amplitude and possibly an adjustable modulation phase.

This system has many advantages over the existing responder systems, notably:
 a very low production cost;
 no physical link with the radar (autonomous system);
 no complex electronics to be used to operate it;
 rugged (and therefore able to be used on exposed sites);
 passive system: no transmission and no radiation of local waves;
 wide operating range;
 very low power consumption (and therefore long autonomous life); and
 ease of integration on all types of carrier.

According to one embodiment, two successive microwave lines may have a length difference equal to $\lambda/2$, $\lambda$ being the wavelength of the signal received by the antenna.

Preferably, the system comprises two microwave lines.

According to one embodiment, the generator may be capable of controlling the switch as a function of a predefined code.

According to one embodiment, the generator may be capable of controlling the switch dynamically.

A second aspect of the invention provides for use of a system as mentioned above within an airborne target co-operating with said radar.

As a variant, what is also proposed is use of a system as mentioned above for calibrating said radar.

As a variant, what is also proposed is use of a system as mentioned above within location beacons.

BRIEF DESCRIPTION OF THE DRAWINGS

Other advantages and features of the invention will become apparent on examining the detailed description of embodiments of the invention, which are in no way limiting, and the appended drawings in which.

DETAILED DESCRIPTION

Figure 1:
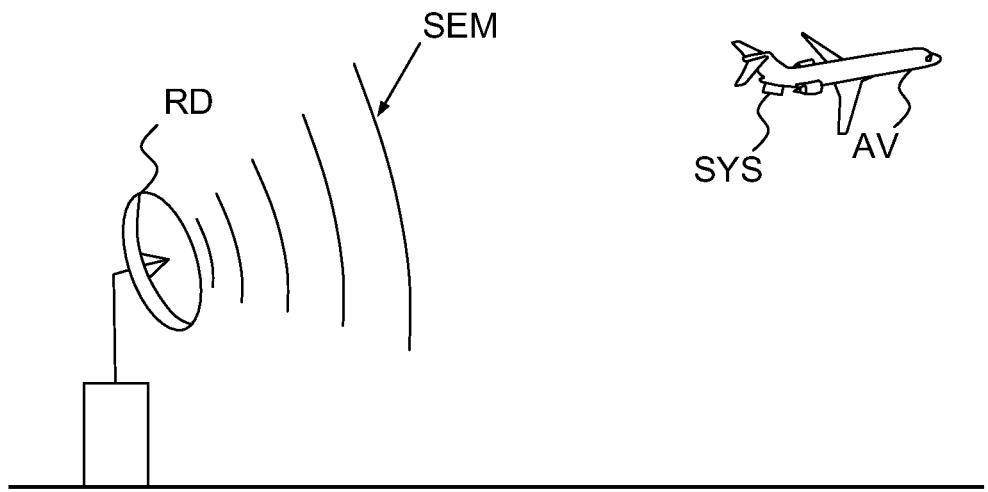
FIG. 1 illustrates one way of using the invention.

FIG. 1 shows a radar RD, here of the MTI type, emitting a signal SEM to an aircraft, here a plane AV. This plane AV has on board a response system SYS. This receives and then backscatters a signal or echo according to the transmitted signal SEM to the radar RD.

Figure 2:
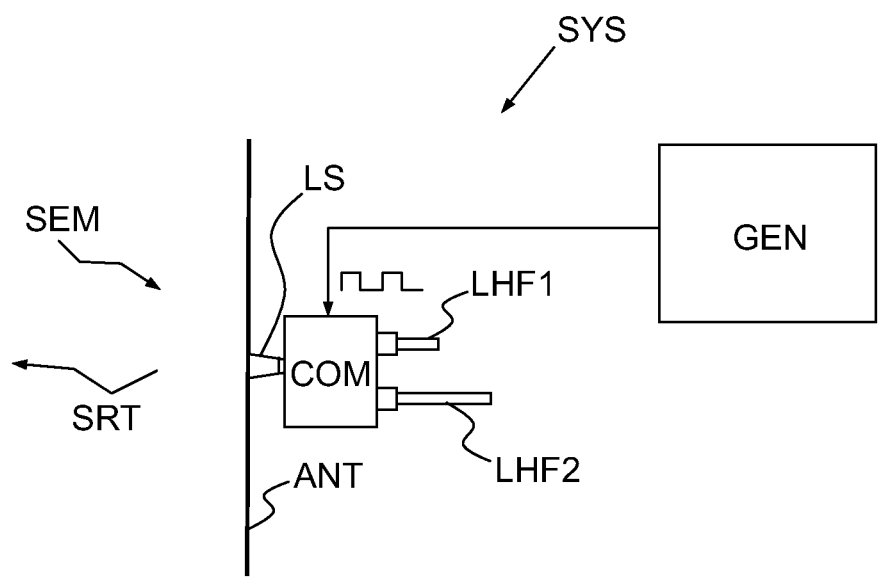
FIG. 2 shows one embodiment of the response system according to the invention.

FIG. 2 shows in greater detail one embodiment of the system SYS.

This system comprises a passive antenna ANT capable of receiving a signal SEM, for example one transmitted by an MTI radar, and of backscattering a signal SRT in response. This signal results from the processing carried out on the received signal SEM.

The signal SEM received by the antenna ANT is transmitted to a microwave switch COM via a link LS. This switch COM is coupled to two microwave lines LHF1 and LHF2, the lengths of which are notably dependent on the radar with which the system SYS communicates. Of course, more generally the microwave switch COM may be coupled to N microwave lines, N being an integer equal to or greater than 2. These microwave lines are chosen with separate impedances.

In this example, the microwave lines have a difference of $\lambda/2$, $\lambda$ being the wavelength of the received signal SEM. Thus, the impedance of the first microwave line LHF1 is 50Ω (matched load), whereas the impedance of the second microwave line LHF2 is infinite (short circuit).

The switch COM connects the antenna ANT alternately to the first and then to the second microwave line thus modulating the cross section of the antenna ANT and consequently the amplitude of the signal SRT backscattered by the system SYS to the radar, as explained in greater detail below.

When the microwave switch COM connects the antenna ANT to the first microwave line LHF1, while it is illuminated by a radar at a frequency corresponding to its operating range, most of the energy picked up by the antenna ANT is then transmitted to the load LHF1 and the cross section of the antenna seen from the radar transmitting the signal SEM is virtually zero.

Conversely, when the microwave switch COM connects the antenna ANT to the second microwave line LHF2, the energy then picked up by the load LHF2 is retransmitted to the antenna ANT. The radar cross section (SER) of the antenna ANT, seen from the radar transmitting the signal SEM which illuminates it, is equal to the cross section of the antenna ANT multiplied by its gain at the frequency in question.

The switch COM is controlled by a generator GEN. The control signal may for example be a square signal of 1:1 duty cycle. At each control front of the generator GEN, the switch switches from one microwave line to the other. This oscillation between the two microwave lines causes an amplitude modulation of the backscattered signal SRT.

This amplitude modulation may also be made trapezoidal or quasi-sinusoidal by filtering, using a low-pass filter connected at the output of the generator GEN, the control of the microwave switch COM. Thus, the level of the harmonics in the modulation spectrum may be controlled.

The amplitude modulation may also be carried out over several states, if, as indicated above, the microwave switch COM has several channels connected to different values of loads.

According to the same principle, it is also possible to adjust the imaginary components of the impedances of the microwave lines so as to carry out phase modulation of the backscattered signal SRT.

Finally, it is possible, using this principle, for any modulation codes to be generated dynamically, these being capable of transmitting information to the illuminating source (for example an MTI radar) stealthily. The latter principle makes it possible for example to use the system SYS to differentiate between carriers by their fingerprint.

It should be noted that there are many options for producing the system SYS and there are many solutions for producing the responder:

The antenna ANT may be a printed patch antenna. Moreover, all types of passive antennas may be suitable for producing the antenna ANT.

The link LS, between the antenna ANT and the switch COM, and also the microwave lines may be produced using a microwave coaxial cable.

The microwave switch COM may be of the modulable type and produced on a printed circuit (microstrip lines), as may the microwave lines.

The most compact and lightest construction is obtained by combining, on one and the same circuit:
the printed patch antenna ANT;
the microwave switch COM and the microwave lines in microstrip technology; and
the generator GEN in conventional SMC technology (SMC standing for "surface-mount components") well known to those skilled in the art.

Figure 3:
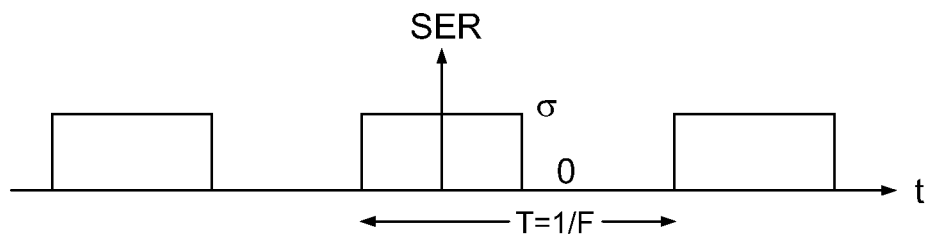
FIG. 3 shows the variation in the radar cross section of the antenna of the response system according to the invention.

Referring now to FIG. 3, this illustrates the variation in radar cross section (SER) of the antenna ANT depending on whether the switch COM connects it to one or other of the two microwave lines.

As an example, this curve is obtained for a printed antenna of square shape measuring 9 cm×9 cm, the estimated gain is around 17 dB (or 50 dB in linear scale) for transmission in the X band, and the corresponding radar cross section (SER) is around $\sigma=0.4$ m$^2$.

Figure 4:
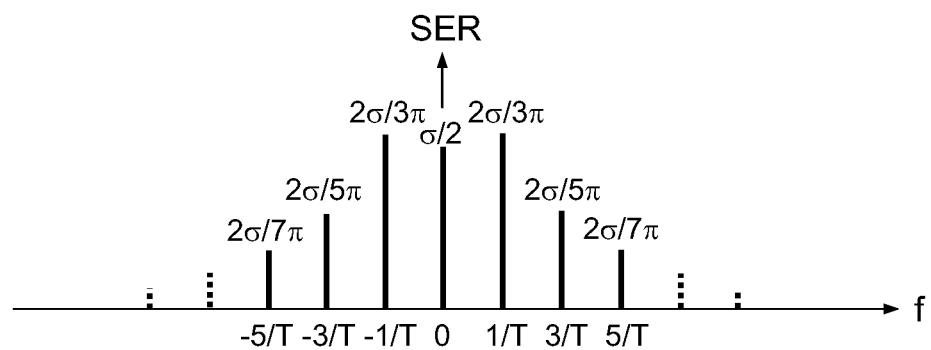
FIG. 4 shows the corresponding amplitude modulation spectrum.

For a square modulation over a matched load and a short circuit, at the frequency F, the amplitude modulation spectrum, shown in FIG. 4, comprises three components:
a line at zero frequency of amplitude equal to $\sigma/2=0.2$ m$^2$; and
a number of symmetrical lines at $+(2k+1)F$ and $-(2k+1)F$, having as amplitude: $\sigma.[\sin(n.\pi 2)]/(n.\pi 2)$.

The echo received by the radar is the signal backscattered by the antenna ANT and is therefore amplitude-modulated at the frequency of the modulation signal.

This echo will be detected by conventional Doppler processing of an MTI radar, for example using a numerical Fourier transform.

The amplitude and ancillary phase modulation is translated by the MTI radar by the Doppler effect. Thus, even if the target is moving at very low speed or is stationary, the MTI radar will be able to analyse the returned echo thanks to the Doppler effect induced by the system and simulating a certain speed.

There are many uses of a system according to the invention.

It may be mounted within location beacons with distance referencing, for very low cost.

The invention also allows very precise detection and location of co-operative targets, even with a zero relative speed, thanks to a very simple and very lightweight device carried by these targets.

In particular, the invention allows the detection and location of a reference point located perfectly on a large target, observed by a radar a very short distance away.

The last two functions are useful notably for deck-landing assistance devices, in particular for drones, in which a radar detection on the skin echo does not allow sufficient short-range location precision because of fluctuations and shifts over time of the bright spot.

Finally, the invention may be carried out in order to differentiate carriers by their fingerprints or to produce a very simple communication means, from a co-operative target to a radar transmitter.

The invention claimed is:

1. A system for response to a signal transmitted by a radar, comprising:
a passive antenna configured to receive and then backscatter a signal transmitted by the radar;
a microwave switch connected to said antenna;

at least two microwave lines each having a distinct impedance and being connected to the microwave switch, wherein two successive microwave lines of the at least two microwave lines have a length difference equal to $\lambda/2$, where $\lambda$ is a wavelength of the signal received by the antenna; and a generator configured to generate a parametrizable control signal and send the parametrizable control signal to the microwave switch so that the microwave switch switches onto one or the other of the at least two microwave lines, so as to modulate the signal backscattered by said antenna.

2. The system according to claim 1, wherein the at least two microwave lines consist essentially of two microwave lines.

3. The system according to claim 1, wherein the generator is configured to control the switch as a function of a predefined code.

4. The system according to claim 1, wherein said generator is configured to control the switch dynamically.

5. An airborne target comprising the system according to claim 1, the airborne target configured to respond to a signal transmitted by a radar.

6. A method of responding to a signal transmitted by a radar comprising:

provproviding a passive antenna configured to receive and then backscatter a signal transmitted by the radar;

providing a microwave switch connected to said antenna;

providing at least two microwave lines each having a distinct impedance and being connected to the microwave switch, wherein two successive microwave lines of the at least two microwave lines have a length difference equal to $\lambda/2$, where $\lambda$ is a wavelength of the signal received by the antenna;

providing a generator configured to generate a parametrizable control signal and send the parametrizable control signal to the microwave switch so that the microwave switch switches onto one or the other of the at least two microwave lines, so as to modulate the signal backscattered by said antenna; and operating the passive antenna, the microwave switch, and the generator to calibrate said radar.

7. A location beacon comprising the system according to claim 1, the location beacon configured to respond to a signal transmitted by a radar.

* * * * *